United States Patent [19]
Dray

[11] 3,734,667
[45] May 22, 1973

[54] PLASTIC EXTRUSION APPARATUS
[75] Inventor: Robert F. Dray, New Castle, Pa.
[73] Assignee: Extruders, Inc., New Castle, Pa.
[22] Filed: Sept. 30, 1970
[21] Appl. No.: 76,698

[52] U.S. Cl. .................. 425/190, 425/135, 425/192
[51] Int. Cl. .............................. B29f 3/06, B29f 3/01
[58] Field of Search ...................... 18/12 SR, 12 SA,
 18/12 SM, 12 SH, 14 R, 30 SS, 30 SR, 30
 SM, 30 FH, 30 FM, 30 HH; 91/109, 392;
 425/135, 190, 191, 376; 259/191

[56] References Cited
UNITED STATES PATENTS

| | | | |
|---|---|---|---|
| 3,015,844 | 1/1962 | Rice | 18/12 SR X |
| 3,204,294 | 9/1965 | Brochetti | 18/30 SS |
| 3,191,234 | 6/1965 | Hendry | 18/12 SA X |
| 3,001,233 | 9/1961 | Ernst | 18/30 SS |
| 3,354,501 | 11/1967 | Bachman et al. | 18/30 HB X |
| 2,427,960 | 9/1947 | Griffiths | 18/12 SA |
| 3,301,933 | 1/1967 | Plymale | 18/12 SA X |
| 3,162,900 | 12/1964 | Huelskamp | 18/12 SR X |
| 2,090,434 | 8/1937 | Thalmann | 18/12 SR |
| 2,411,971 | 12/1946 | MacMillin et al. | 425/135 |

Primary Examiner—J. Spencer Overholser
Assistant Examiner—David S. Safran
Attorney—Arland J. Stein, Thomas C. Wettach and Robert D. Yeager

[57] ABSTRACT

A plastic extrusion apparatus of the type employing a rotatable screw mounted in an elongated tubular member and including pressures fluid operated piston means operably connected to the screw for applying a compressive axial force to the screw in a direction toward the discharge port of the extrusion apparatus. The apparatus further includes means operably connected to the piston means for ejecting the screw from the tubular member upon reciprocation of the piston means.

2 Claims, 7 Drawing Figures

INVENTOR
Robert F. Dray

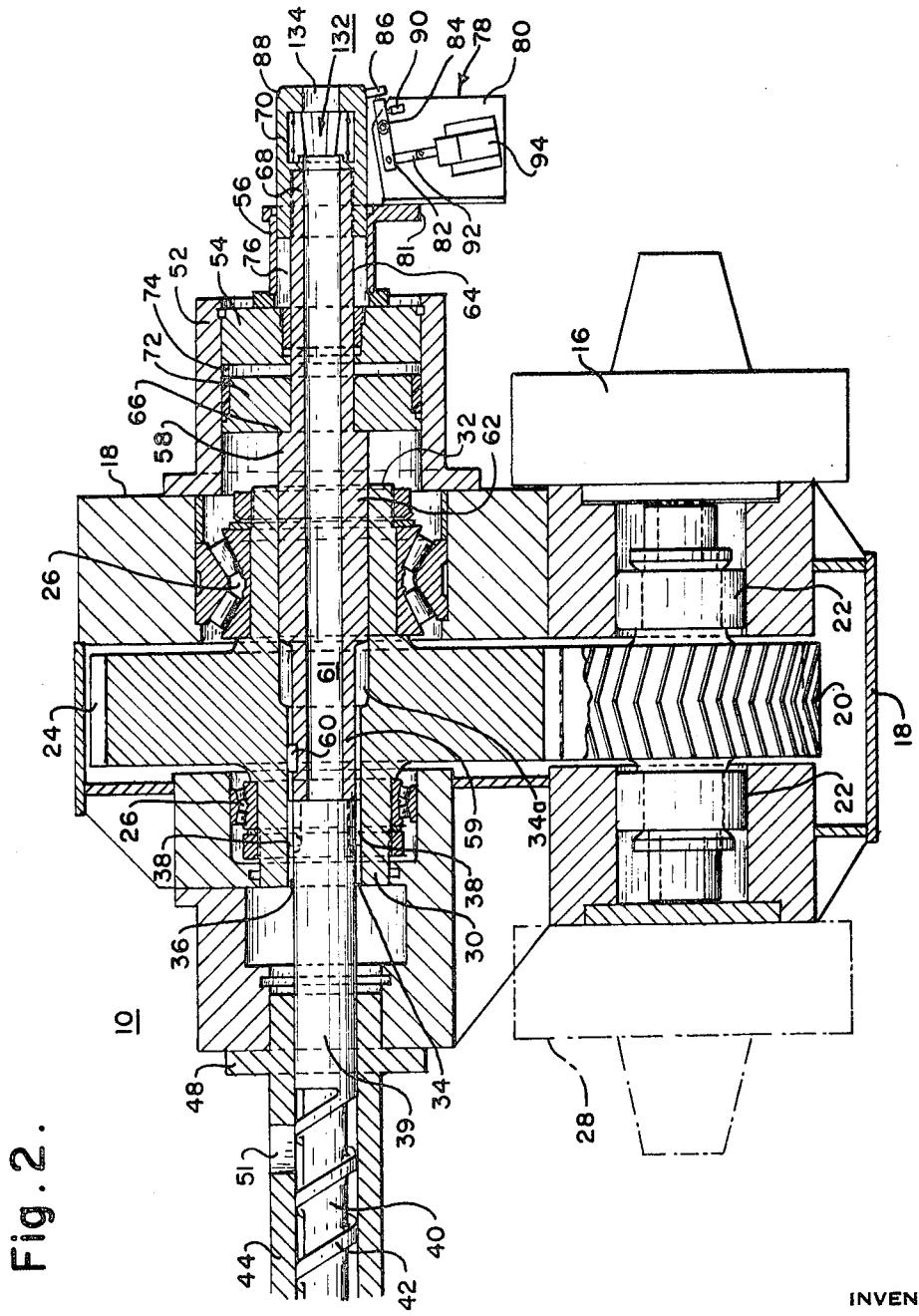

INVENTOR
Robert F. Dray

PLASTIC EXTRUSION APPARATUS

This invention relates to a plastic extrusion apparatus; more particularly to an extruder which employs hydraulics to produce unique advantages in the normal extrusion operation and in the servicing procedures associated therewith.

Extrusion of thermoplastics consists of the melting and compressing of plastic particles while they are being forced through a long passage by a screw conveyor turning in that passage. The opening at the end of the passage takes various shaped depending on the desired cross-section of the finished product.

A typical extruder includes an elongated screw mounted for rotation within a barrel. The end of the screw nearest the feed opening is engaged with a drive sleeve. The drive sleeve, in turn, is mounted in a thrust bearing which is intended to absorb the large axial loads generated by plastic being forced through a discharge opening (or die) at the opposite end of the barrel. Tapered roller bearings are commonly used as the thrust bearing. A recurring problem which arises in extruder operations is the uneven application of force to these roller bearings caused by mis-alignment of the screw and/or the barrel with corresponding reduction in bearing life.

The power source for rotation of the screw is generally an electric motor operating at varying speeds within its normal range to provide the necessary horsepower for the particular extrusion operation. In practically all cases, an electric motor requires large speed reduction equipment in the drive system to produce the torque needed in extrusion operations. For example, 15:1 drive reduction ratios or greater are common in electrically powered extruders. The large drive reduction components required in these extruders create over-all machine design problems and often complicate the alignment of the entire assembly.

In any extruding machine, it is necessary that the screw and the inside of the barrel be cleaned periodically. This is always true when the feed material is changed so that co-mingling of different plastic materials is avoided. The cleaning operation necessitates removal of the screw from the barrel which can be a laborious and time consuming procedure. Most often screw removal is accomplished by a mechanical pusher attached to the drive end of the screw. The pushing apparatus may take the form of a threaded rod as in U.S. Pat. No. 2,090,434 or the form of a hydraulic ram as in U.S. Pat. No. 3,015,844. In any case, screw ejection mechanisms known heretofore are considered accessory equipment and are not integrally operable with the extruder components.

I have discovered an extruder which includes hydraulic drive means and a hydraulic thrust bearing in a configuration which enables me to achieve significant design efficiencies not present in known extruders.

I provide a plastic extrusion apparatus comprising a housing; a rotatable drive member having an axial bore supported for rotation within the housing; hydraulic driving means coupled with the drive member for rotating the drive member; an elongated tubular member connected to the housing and extending therefrom in co-axial alignment with the bore of the drive member, the tubular member having a discharge port in the end remote from the housing and a feed opening adjacent the housing; a rotatable screw slidably mounted within the tubular member and releasably connected to the drive member, the screw being capable of axial motion relative to the drive member but being engaged with the drive member for rotation thereby; pressure fluid operated first piston means operably connected to the screw for applying a compressive axial force to the screw in a direction toward the discharge port; and means operably connected to the first piston means for ejecting the screw from the tubular member upon reciprocation of the first piston means.

I preferably provide that the hydraulic means includes at least one hydraulic motor and pressure fluid generating means for driving the motor. Further, I provide means responsive to axial displacement of the screw for controlling the position of the first piston means and a hopper in communication with the feed opening and adapted to embrace the exterior of the tubular member.

I further provide a piston rod connected to the first piston means at one end and extending into the bore of the drive member for abutment with the screw at the other end, the piston rod being engaged with the drive member for rotation thereby; and prefer that the piston rod extend through the first piston means in a direction away from the screw and that the piston rod have a central bore formed therein.

I provide, in addition, screw ejection means comprising second piston means connected to the end of the piston rod remote from the screw, the second piston means having a central bore axially aligned with the central bore of the piston rod; a rod slidably disposed within the aligned bores of the piston rod and the second piston means; and means mounted upon the second piston means for releasably gripping the rod; whereby the rod is sequentially advanced in a direction toward the screw by first stroking the first piston means while the rod is held by the gripping means, then retracting the first piston means by actuating the second piston means while relaxing the hold of the gripping means upon the rod.

I further provide a plastic extrusion apparatus comprising a housing; a rotatable drive gear having a central bore supported for rotation within said housing; at least one hydraulic motor coupled with said gear for rotating said gear; an elongated tubular member connected to said housing and extending therefrom in co-axial alignment with said gear, said tubular member having a discharge port remote from said housing and a feed opening adjacent said housing; a rotatable screw slidably mounted within said tubular member, said screw being capable of longitudinal movement in relation to said gear but being engaged with said gear for rotation thereby; piston means operably connected to said screw for applying a compressive axial force to said screw in a direction toward said discharge port; an ejector rod releasably coupled to said piston means and adapted to be advanced in a direction toward said screw upon stroking of said piston means from a first position to a second position; and means for retracting said piston means from said second position to said first position, said retraction taking place while said rod is released from its coupling with said piston means. Preferably, I provide that the piston means comprises a cylinder having first and second chambers formed therein mounted upon the housing opposite from the tubular member and in axial alignment therewith; a piston rod having a central bore slidably disposed within the bore of the gear, the rod abutting the screw at one end and extending through the first and second chambers; and first piston means mounted upon the piston rod and slidably disposed within the first chamber. I also prefer that the ejector rod be slidably disposed within the bore of the piston rod and that the ejector rod be releasably coupled to the first piston means through gripping means. And, I prefer that the retracting means comprises second piston means mounted upon the piston rod and adapted for axial movement within the second chamber.

I also provide in a plastic extrusion apparatus of the type employing a rotating screw mounted in an elongated tubular member, a pressure fluid operated piston operably connected to the screw for axially loading the screw and means operably connected to the piston for ejecting the screw from the tubular member upon reciprocation of the piston.

Other details, objects and advantages of the invention will become apparent as the following description of a present preferred embodiment thereof proceeds.

In the accompanying drawings, I have shown a present preferred embodiment of the invention in which:

FIG. 2 is an enlarged side elevational view, partly in section, of a portion of the extrusion apparatus shown in FIG. 1;

Figures 1, 6, 7:
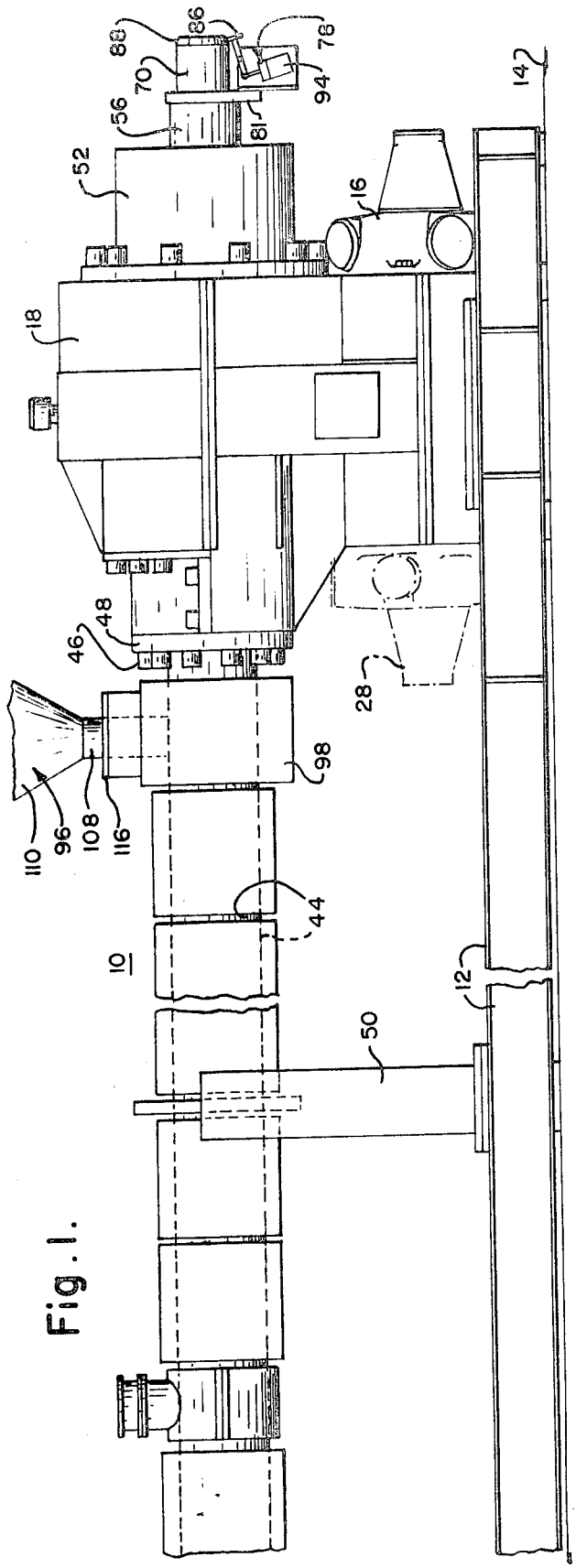
FIG. 1 is a side elevational view of the extrusion apparatus of the present invention.
FIG. 6 is an enlarged side elevational view, partly in section, of a portion of a screw ejector mechanism embodied in the present invention.
FIG. 7 is a sectional view taken on the line VII—VII of FIG. 6.

Referring to the drawings, particularly to FIG. 1, the reference numeral 10 refers generally to an extrusion apparatus including a base 12 which may be welded steel or cast iron, designed to be bolted to a concrete floor 14. Supported on the base 12 is a hydraulic motor 16 driven by suitable pressure fluid generating means (not shown) such as a variable displacement pump. The manner of driving and controlling hydraulic motor 16 is well understood by workers in the art and, therefore, these details are not shown.

Hydraulic motor 16 is preferably a low speed, high torque radial piston motor. The use of this type of drive produces substantial advantages in extrusion operations over the well-known electrically driven extruders. For example, an electric motor rated at 100 h.p. at 1,000 r.p.m. would produce less than one-half of its rated horsepower when operated at one-half of its rated speed, i.e., 500 r.p.m. A hydraulic motor, of the type preferred in the present invention, however, would produce constant horsepower regardless of its operating speed. And, as is well-known to those skilled in the plastic extrusion art, horsepower delivered to the screw is of extreme importance to successful extrusion operations. As will be discussed hereinafter, the present invention permits the "stacking" of hydraulic motors to multiply the horsepower delivered to the screw.

Referring now to FIG. 2, hydraulic motor 16 is suitably coupled to drive reduction means housed in gear housing 18. A drive reduction of about 2:1 is obtained in this preferred embodiment. If desired, however, appropriate selection of the hydraulic drive motor permits direct 1:1 drive of the extrusion apparatus at variable speeds with constant horsepower. The use of a hydraulic drive eliminates the requirement for large reduction gears associated with electrically driven extruders because the hydraulic motors may be operated at the relatively low r.p.m. ranges used in extruders without a sacrifice in horsepower delivered to the screw. This means, of course, that numerous changes may be effected in standard extruder designs in order to reduce the recurring problems in alignment, bearing life, etc.

The drive reduction means includes a pinion 20 rotatably mounted on bearings 22. Pinion 20 meshes with final drive gear 24, also suitably mounted for rotation on bearings 26. It may be observed that a second hydraulic motor 28 (shown in chain line) may be positioned on the opposite side of pinion 20 from hydraulic motor 16 and suitably coupled to pinion 20. This arrangement permits an increase in the horsepower delivered to the extruder 10, if desired.

Final drive gear 24 includes integral journal portions 30 and 32. A central bore 34 extends through final drive gear 24, the right-hand portion of bore 34 being of increased cross-section over the left-hand portion thereof. Longitudinally extending slots 36 are formed in the inner surface of journal 30, diametrically opposite one another, to receive keys 38 formed on diametrically-opposed portions of the shank end 39 of a feed screw 40. Slots or keyways 36 provide a releasable connection between journal 30 and screw 40 by permitting longitudinal movement of screw 40 within slots 36; however, the engagement of keys 38 within slots 36 prevent relative rotational motion between screw 40 and final drive gear 24.

The particular size and design of screw 40 may vary but it will include flights 42 (see FIG. 2). Screw 40 is conventionally mounted for rotation within elongated barrel 44. It may be noted that barrel 44 is mounted directly to gear housing 18 by bolts 46 through flange 48. This direct mounting feature is helpful in the overall alignment of the extruder and is an improvement over prior art designs as discussed hereinafter.

The opposite end of barrel 44 is suitably supported in a horizontal orientation by upstanding member 50 extending from base 12. Barrel 44 is provided with a feed opening 51 and a discharge port (not shown), sometimes called a gate. A unique advantage of the use of hydraulics in an extruder of this type is that the ready availability of hydraulic systems permits the use of a hydraulic die clamp to hold the die firmly to barrel 44 at the discharge port.

Referring now to the right-hand side of gear housing 18, a piston cylinder 52 having a wall 54 is mounted to gear housing 18 in co-axial alignment with barrel 44. A second piston cylinder 56, here shown as having a reduced diameter, is mounted on the wall 54. A piston rod, generally referred to by the numeral 58, is disposed for longitudinal movement within bore 34 and is keyed for rotation to final drive gear 24 by key 60 engaging keyway 36. Piston rod 58 has an axial bore 61 extending therethrough, the purpose of which will be described hereinafter. Piston rod 58 has at its left-hand portion 59 a diameter corresponding to the shank 39 of screw 40 and abuts thereto within bore 34 of journal 30. A central portion 62 of piston rod 58 is of a larger diameter than portion 59, corresponding to the bore 34a within journal portion 32. The right-hand portion 64 of piston rod 58 has a reduced diameter from central portion 62, forming a shoulder 66. The extreme right-hand portion 68 of piston rod 58 is externally threaded to receive internally threaded piston 70.

A piston 72 is mounted on piston rod 58 in abutment with shoulder 66 and is suitably fastened thereto. Piston 72 is adapted for rotation and reciprocation within the cylinder 52 by suitable bearings and seals. It will be apparent that positive longitudinal movement of piston 72 occurs only in a direction toward screw 40. This movement is accomplished by introducing fluid under pressure into chamber 74 formed within cylinder 52 by piston 72 and wall 54 through suitable passageways and ports (not shown). Control of the flow of fluid to chamber 74 will be discussed hereinafter.

Positive longitudinal movement of piston 72 in a direction away from the screw is provided by piston 70, although this movement is ordinarily carried out only in connection with the screw ejection operation described hereinafter. Piston 70 is adapted for rotation and reciprocation within cylinder 56 by suitable bearings and seals. Movement of piston 70 to the right (away from the screw) is carried out by introducing fluid under pressure into chamber 76 formed within cylinder 56 by wall 54 and piston 70 through passageways and ports (not shown). Control of fluid flow to and from chamber 76 is by means well-known in the art.

A sensor mechanism, generally referred to by the numeral 78, is provided to detect any axial movement of screw 40. Sensor mechanism 78 includes a plate 80 hingedly mounted to a downwardly extending portion 81 of cylinder 56. An arm 82 is pivotally mounted upon plate 80 at 84. The free end of arm 82 carries a wheel 86 which is urged against a bevelled surface portion 88 of piston 70 by bias means 90 mounted upon plate 80. The opposite end of arm 82 is pivotally connected to linkage 92 which in turn actuates servo 94. During normal extrusion operations, servo 94 controls the flow of fluid under pressure to and from chamber 74 and hence controls the position of piston 72.

Figure 3:
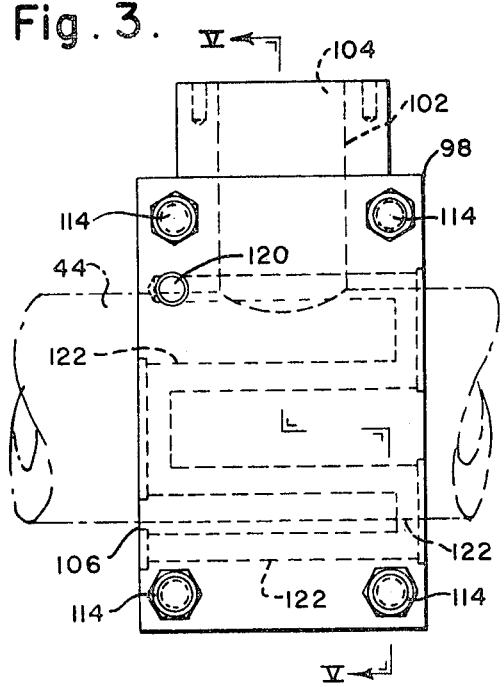
FIG. 3 is an enlarged side elevational view of a hopper mounting assembly.
Figure 4:
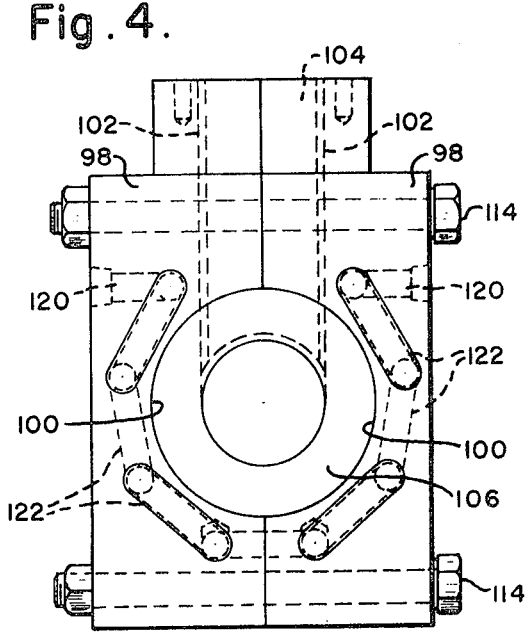
FIG. 4 is an end elevational view of the assembly shown in FIG. 3 as viewed from the right.
Figure 5:
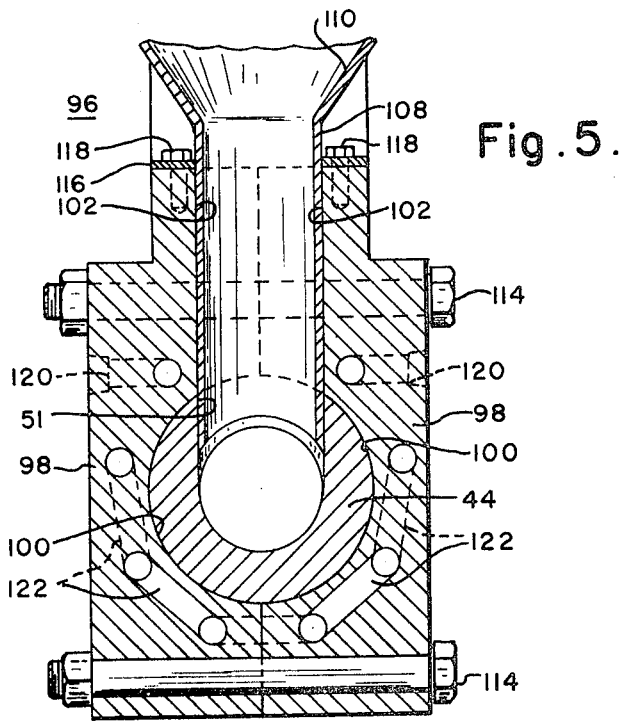
FIG. 5 is a sectional view taken on the line V—V of FIG. 3.

To complete the description of the apparatus used in normal extrusion operations, we return to the left-side of gear housing 18 and to FIG. 1. There is shown a hopper assembly generally referred to by the numeral 96. Referring to the detailed showings of FIGS. 3–5, hopper assembly 96 includes mating sections 98, each having interior semi-circular slots 100 dimensioned to fit snugly around the circumference of barrel 44. Mating sections 98 also have vertical slots 102, usually of semi-circular cross-section, forming a passageway 104 in open communication with the passageway 106 formed by slots 100. The mating sections 98 are positioned on the barrel 44 so that passageway 104 is aligned with feed opening 51. A feed tube 108 having flared upper end portions 110 and a fishmouth lower end portion 112 to straddle on upper surface portion of screw 40 is fitted within passageway 104. Transverse bolts 114 are then drawn up tightly to secure mating sections 98 in position on barrel 44. Tube 108 has flange portions 116 through which bolts 118 are passed for holding tube 108 in place within mating sections 98. Mating sections 98 are provided with suitable porting 120 and passageways 122 for the flow of heating fluids.

In prior art extruders, a separate hopper casting was generally disposed between the barrel and the drive reduction housing. This arrangement often complicated correct and precise alignment of the screw. By eliminating the hopper casting and coupling the barrel 44 directly to the gear reduction housing 18, I have avoided a possible source of mis-alignment in the present invention.

The operation of piston 72 and the associated sensor mechanism 78 during an extrusion operation may be described as follows: When extrusion operations are being carried out, piston 70 is normally in a fully extended position (as shown in FIG. 2). Drive gear 24 is rotating screw 40 and piston rod 58 which in turn is rotating pistons 72 and 70. Wheel 86, which is in contact with surface portion 88 of piston 70, turns as piston 70 rotates. Since piston 70 is rotating, the provision of a wheel at this point of contact tends to reduce friction and produce a more accurate detection of the axial movement of piston 70. As plastic is forced through the barrel 40, out the discharge port and through a die at the end of barrel 40, axial forces are generated tending to push screw 40 away from the discharge port. Any movement of screw 40 in this direction is transmitted to abutting piston rod 58 and this movement results in corresponding movement of piston 70. Wheel 86, riding on bevelled surface 88 is thereby thrust downwardly, causing arm 82 to pivot about its mounting point 84. The pivoting of arm 82 causes upward movement of linkage 92 which causes servo 94 to be actuated. The actuation of servo 94 causes the flow of an appropriate amount of fluid under pressure into chamber 74 behind piston 72 thereby forcing piston 72 (and hence screw 40) to return to its original position.

As stated above, removal of the screw from the barrel is required for periodic cleaning of the screw and the interior of the barrel. Another occasion for removing the screw is when a freeze test is made. A freeze test is a procedure for taking a sample of the material being extruded to determine the actual conditions to which the plastic is being subjected within the barrel. The procedure involves a rapid cessation of normal extruding operations, immediately followed by the application of severe cooling to the barrel. This causes the plastic material to solidify in the barrel. A slight amount of heat is then applied to melt the plastic at its interface with the barrel. The gate is removed and the screw is ejected. A sample of solidified plastic is pushed out of the barrel along with the screw. It thus becomes desirable to provide a rapid and convenient method for removing the screw to carry out freeze tests as well as routine and emergency maintenance.

The screw ejection means in the present invention is uniquely coupled with the hydraulic thrust bearing so that the same piston which absorbs the axial load of the screw during extrusion operations is used to force the screw from the barrel. Some portions of the screw ejection means are shown in FIG. 2 but we will refer to FIGS. 6 and 7 in the detailed description which follows.

Piston 70 includes a chamber 130 for housing gripping means generally designated by the numeral 132. A bore 134 of generally the same diameter as bore 61 in piston rod 58 forms a passage from chamber 130 to the right-hand end of piston 70. Disposed with bores 61 and 134 is a rod 136 of circular cross-section and having repeating annular portions 138 and annular portions 140 of lesser diameter than portions 138 separated by truncated conical sections 142. The surface of each truncated conical section 142 forms a cam surface, for example, as at 144. A shoulder 146 is formed by the juncture between the greater and lesser diameter annular portions 138 and 140. Gripping means 132 includes a collet 148 made up of a plurality of arcuate segments 150. A pair of garter springs 152 embrace the exterior surfaces of segments 150 thereby biasing the collet 148 to a closed position. The collet 148 is retained within chamber 130 by a shoulder 154 and projecting portions 156 on each segment 150. The right-hand end portion 158 of each segment 150 abuts a wall 160 of chamber 130. The interior surface portions 162 of segments 150 cooperate with the cam surfaces 144 of rod 136.

The screw ejection mechanism operates as follows: Sensor mechanism 78 is swung outwardly on its hinged mounting, out of contact with piston 70. Rod 136 is inserted into bore 134, through chamber 130 and into bore 61 of piston rod 58 so that its forward end abuts shank 39 of screw 40. Free movement of rod 136 past gripping means 132 is permitted because as rod 136 is advanced, cam surface 144 of truncated conical section 142 exerts pressure radially outwardly against interior surface portion 162 of each segment 150. Garter springs 152 yield against this pressure and permit radially outward movement of collet segments 150 toward the open position. Rod 136 continues to advance until shoulder 146 located at the trailing edge of each annular section 138 passes the leading edge 164 of collet 148. At this time, garter springs 152 snap collet 148 to the closed position. This sequence is repeated until the rod is moved into abutment with screw 40. Then, with collet 148 firmly engaging rod 136, i.e., right-hand portion 158 in abutment with wall 160, piston 72 is moved within cylinder 52 toward screw 40. This movement is accomplished by the technique described above except that separate control means may be employed. Gripping means 132 move with piston 72 and carry with it rod 136. The movement of rod 136 urges screw 40 toward the discharge port. When piston 72 has reached its limit of travel forwardly, pressure in chamber 74 is relieved by appropriate controls and piston 70 is actuated for movement rearwardly within cylinder 56. Rearward movement of piston 70 causes piston 72 to return to its original position. Free movement of gripping means 132 over rod 136 occurs in the manner described above except that now the gripping means 132 is moving while the rod 136 is stationary. The forward stroking of piston 72 is repeated until screw 40 has been thrust out of barrel 44.

I claim:

1. A plastic extrusion apparatus comprising:
a housing;
a rotatable drive member supported for rotation within said housing and having an axial bore therethrough;
hydraulic driving means coupled with said drive member for rotating said drive member;
an elongated tubular member connected to said housing and extending therefrom in co-axial alignment with said bore of said drive member, said tubular member having a discharge port in the end remote from said housing and a feed opening adjacent said housing;
a rotatable screw slidably mounted within said tubular member and releasably connected to said drive member, said screw being capable of axial motion relative to said drive member but being engaged with said drive member for rotation thereby;
first piston means adapted for rotation with said drive member and contact with said screw for applying an axial bearing force to said screw during rotation thereof and for axially moving said screw during non-rotation thereof in a direction toward said discharge port upon an initial advance of said first piston means in said direction, said first piston means including a piston rod having a central bore formed therein communicating with said screw and in axial alignment therewith;
second piston means connected to the end of said first piston means remote from said screw and having a central bore axially aligned with said central bore of said piston rod;
a rod slidably disposed within said aligned bores of said piston rod and second piston means, said rod abutting said screw; and
means mounted upon said second piston means for releasably gripping said rod;
whereby said screw is moved in a direction toward said discharge port by said first piston means and said rod upon said initial advance of said first piston means and thereafter by said rod upon sequential stroking of said first piston means while said rod is held by said gripping means, followed by retraction of said first piston means by actuating said second piston means while relaxing the hold of said gripping means upon said rod.

2. A plastic extrusion apparatus comprising:
a housing;
a rotatable drive gear having an axial bore supported for rotation within said housing;
at least one hydraulic motor coupled with said gear for rotating said gear;
an elongated tubular member connected to said housing and extending therefrom in co-axial alignment with said bore of said gear, said tubular member having a discharge port remote from said housing and a feed opening adjacent said housing;
a rotatable screw slidably mounted within said tubular member, said screw being axially movable in relation to said gear but being engaged with said gear for rotation thereby;
a cylinder having first and second chambers formed therein mounted upon said housing opposite from said tubular member and in axial alignment therewith;
a piston rod having a central bore slidably disposed within said bore of said gear, said rod abutting said screw at one end and extending through said first and second chambers;
first piston means mounted upon said piston rod and slidably disposed within said first chamber;
second piston means mounted upon said piston rod and adapted for axial movement within said second chamber;
a rod slidably disposed within said bore of said piston rod; and
means mounted upon said second piston means for releasably gripping said rod.

* * * * *